Jan. 2, 1968

J. W. WINKLER ETAL 3,361,937

ELECTRICAL COMPONENT ASSEMBLY WITH IMPROVED DIODE AND RESISTOR STRUCTURE

Filed Jan. 18, 1966

INVENTORS.
JAMES W. WINKLER
BY ALEXANDER L. PUGH, JR.

Donald S. Cohen

ATTORNEY

United States Patent Office 3,361,937

Patented Jan. 2, 1968

3,361,937

ELECTRICAL COMPONENT ASSEMBLY WITH IMPROVED DIODE AND RESISTOR STRUCTURE

James W. Winkler, Boone, N.C., and Alexander L. Pugh, Jr., Paoli, Pa., assignors to IRC, Inc., Philadelphia, Pa.

Filed Jan. 18, 1966, Ser. No. 521,385

9 Claims. (Cl. 317—101)

ABSTRACT OF THE DISCLOSURE

An electrical component assembly comprising a housing of an electrical insulating material having a cavity in one surface thereof. A pair of electrical diodes are mounted on the housing within the cavity in spaced apart relation. A pair of spaced terminal wires extend through the bottom of the cavity and are secured to the housing. Each of the terminal wires are electrically connected to an electrode of a separate one of the diodes. A third terminal wire extends through the bottom of the cavity and is secured to the housing. The third terimnal wire is electrically connected to the other electrode of both of the diodes so that each diode is electrically connected between the third terimnal wire and a separate one of the two terminal wires. A pair of electrical resistors are mounted on the housing. Each of the electrical resistors is electrically connected between the third terminal wire and a separate one of the two terminal wires so that each of the resistors is electrically connected in parallel with a separate one of the diodes.

The present invention relates to an electric component assembly, and more particularly to an assembly of electrical resistors and diodes.

The electrical circuits of certain electrical equipment, such as radios and televisions, include a pair of diodes having a common electrode, either the anode or cathode, connected to a common terminal and separate terminals connected to the other electrodes, and a separate electrical resistor connected in parallel with each of the diodes. Although these are commercially available electrical assemblies which include the two diodes properly connected together as a single unit, the two resistors have been separate units which are connected to the diode assembly either by soldering the terminals of the resistors to the diode assembly, or by mounting the three units on a printed circuit board.

The use of these separate electrical elements to form this portion of the electrical circuit has a number of disadvantages for the manufacturing of the electrical equipment. First, it requires the connecting together or mounting on a printed circuit board of three distinct elements. Also, with the trend toward miniaturization, the more separate elements which are used, the more space is required for the circuit. In addition, the more separate units that must be mounted on a printed circuit board, the more complex the circuitry on the board must be. Therefore, to overcome these disadvantages, it is desirable to have all the electrical components in a single assembly.

It is an object of the present invention to provide a novel electrical component assembly.

It is another object of the present invention to provide an assembly of two diodes connected in series and two resistors connected in parallel with the diodes as a single unit.

It is still another object of the present invention to provide an assembly of two diodes and two resistors in a single housing which is small, compact, rigid and capable of being handled mechanically without damage.

Other objects will appear hereinafter.

For the purpose of illustrating the invention, there is shown in the drawings forms which are presently preferred; it being understood, however, that this invention is not limited to the precise arrangements and instrumentalities shown.

Referring initially to FIGURES 1–4, the electrical component assembly of the present invention is generally designated as 10.

Figure 1:
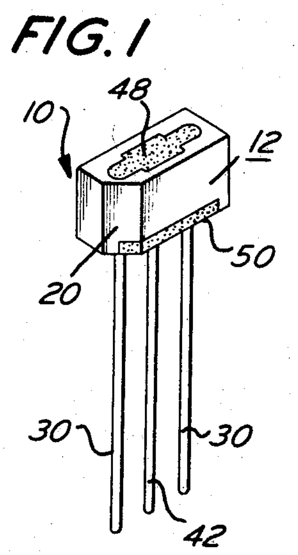
FIGURE 1 is a perspective view of the electrical component assembly of the present invention.
Figures 3, 4, 5, 6:
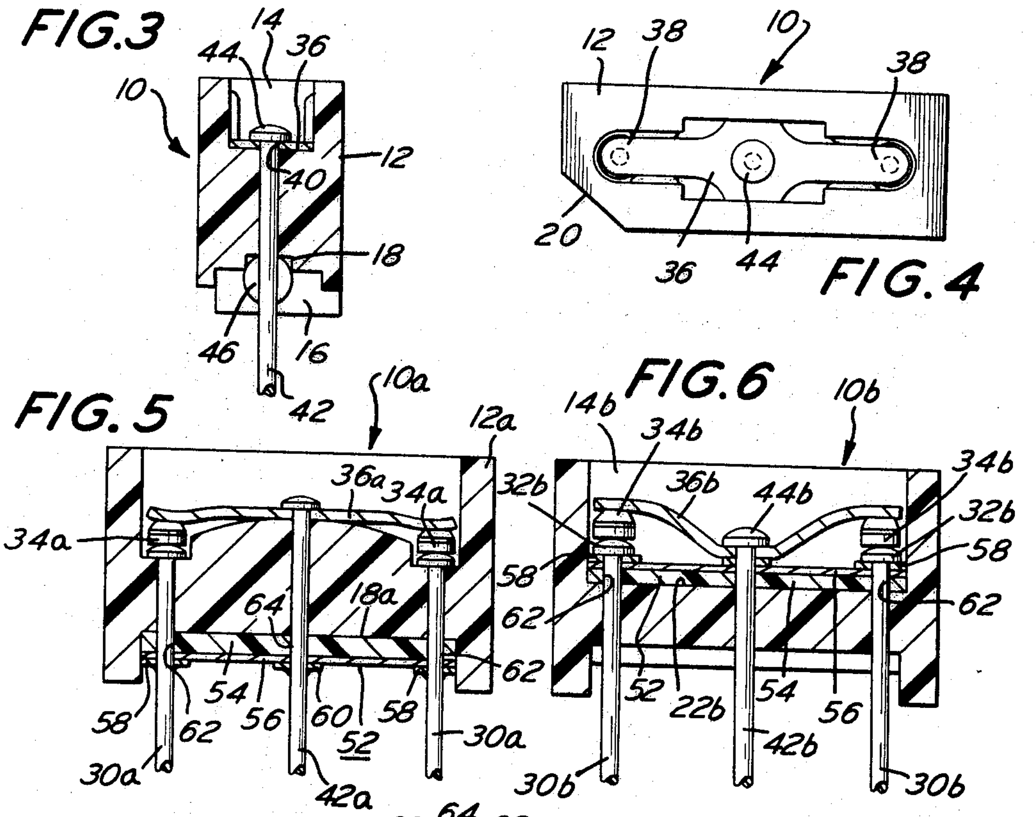
FIGURE 3 is a sectional view taken along line 3—3 of FIGURE 2.
FIGURE 4 is a top plan view of the electrical component assembly of the present invention.
FIGURE 5 is a cross-sectional view of a modification of the electrical component assembly of the present invention.
FIGURE 6 is a cross-sectional view of still another modification of the electrical component assembly of the present invention.

Electrical component assembly 10 comprises a substantially rectangular, rigid housing 12 of an electrical insulating material, such as a plastic or ceramic. Housing 12 has a cavity 14 in its top surface, a pair of parallel legs 16—16 extending from its bottom surface at each end of the housing, and a groove 18 in its bottom surface extending along the bottom surface between the legs 16—16. As shown in FIGURES 1 and 4, one corner of the housing 12 may be removed to provide a flat surface 20 for identification purposes, as will be explained later.

The bottom surface 22 of the cavity 14 is convex and has a substantial cylindrical recess 24 at each end thereof. A pair of holes 26—26 extend through the housing 12 from the bottoms of the recesses 24—24 to the bottom of the housing. A third hole 28 extends through the housing 12 from the center of the bottom surface 22 to the bottom of the housing.

A separate end terminal wire 30 of a relatively stiff, electrically conductive metal extends through each of the end holes 26. Each of the terminal wires 30 has an enlarged head 32 at one end which is seated on the bottom of its respective recess 24. An electrical diode 34 is seated on the terminal wire head 32 in each of the recesses 24. The diodes may be any type of small semiconductor diode, such as a selenium diode, silicon diode or germanium diode. A flat leaf spring 36 of an electrically conductive metal extends across the bottom 22 of the cavity 14 with the ends 38 of the spring engaging the top electrodes of the diodes 34. The leaf spring 36 has a central hole 40 therethrough which is in alignment with the central hole 28 in the housing 12. A central terminal wire 42 extends through the holes 40 and 28 in the leaf spring 36 and housing 12 respectively, and has an enlarged head 44 engaging the top surface of the leaf spring 36. The central terminal wire 42 is of a diameter so as to have a tight fit in the hole 28 in the housing 12. Thus, the central terminal 42 holds the leaf spring 36 against the bottom 22 of the housing 12, and the spring 36 holds the diodes 34 against the heads 32 of the end terminal wires 30.

A pair of electrical resistors 46—46 are mounted in the groove 18 in the bottom surface of the housing 12 and extend between the central terminal wire 42 and each of the terminal wires 30. Resistors 46 may be any well-known type of small resistor such as a solid body of a resistance material, such as carbon or carbon mixed with an insulation material, or a substrate of an insulation material having a film of a resistance material coated on its surface. The resistors 46 are each of a length to engage the central terminal wire 42 and an end terminal wire 30, and are mechanically and electrically connected to the terminal wires 42 and 30 by solder or an electrically conductive cement. The cavity 14 may be filled with an insulating material 48, such as a thermosetting or thermoplastic resin, a ceramic type cement, or a wax, to protect the diode 34. Also, the resistors 46 may be covered with an insulating material 50 of the same type as that used to fill the cavity 14.

Figure 2:
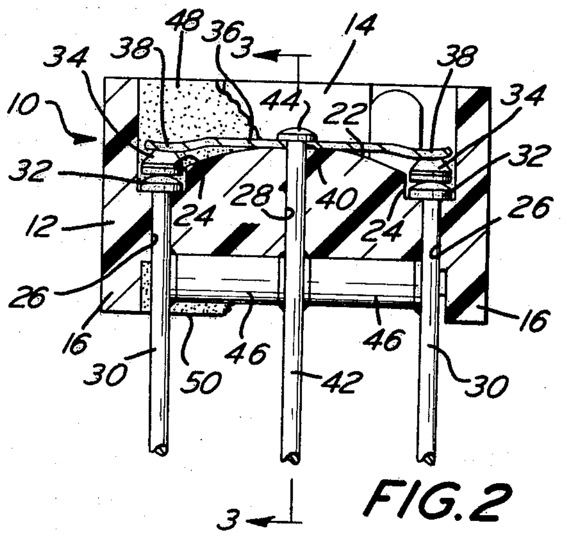
FIGURE 2 is a cross-sectional view of the electrical component assembly of the present invention.

Thus, there is provided by the present invention a small, compact assembly 10 having a pair of diodes 34 electrically connected between separate terminals 30 and a common terminal 42, and a separate electrical resistor 46 electrically connected in parallel with each of the diodes 34. As shown in FIGURE 2 of the drawing, the diodes 34 have the same electrode electrically connected to the common terminal 42 through the spring 36. However, if desired for a particular circuit, one of the diodes 34 may be reversed so that opposite electrodes of the diodes are connected to the common terminal. If one of the diodes is reversed, the flat corner surface 20 of the housing 12 can be used to indicate the particular arrangement of the diodes.

Figure 7:
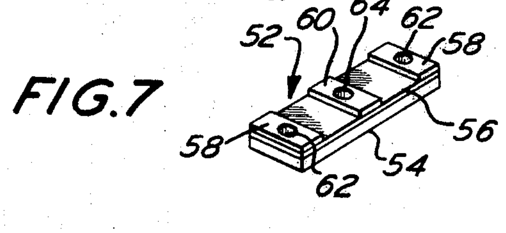
FIGURE 7 is a perspective view of the resistor element used in the electrical component assemblies shown in FIGURES 5 and 6.

Referring to FIGURE 5, a modification of the electrical component assembly of the present invention is generally designated as 10*a*. The assembly 10*a* is identical to the assembly 10 shown in FIGURES 1–4 except for the construction of the resistance element 52. As shown in FIGURE 7, resistance element 52 comprises a flat, rectangular base strip 54 of an electrical insulation material, such as a plastic or ceramic. The base strip 54 is of the same length and width as that of the groove 18*a* in the bottom of the housing 12*a*. A film 56 of an electrical resistance material is coated over one surface of the base strip 54. Termination areas 58—58 of an electrically conductive metal, such as silver or copper, are provided over the resistance film 56 at the ends of the base strip 54. A third termination area 60 is provided over the resistance film 56 intermediate the end termination areas 58—58. Holes 62—62 are provided through the base strip 54 at each of the end termination areas 58, and a hole 64 is provided through the base strip at the center termination area 60. Thus, the resistance element 52 provides two resistors one between each of the end termination areas 58 and the center termination area 60.

The resistance element 52 is mounted in the groove 18*a* in the bottom of the housing 12*a* with the base strip 54 seated against the housing 12*a* and the resistance film 56 facing away from the housing. The end terimnal wires 30*a*, on which the diodes 34*a* are seated, each extend through a separate one of the end holes 62 in the resistance element 52. The center terminal wire 42*a*, which is electrically connected to the diodes 34*a* by the leaf spring 36*a*, extends through the center hole 64 in the resistance element 52. The terminal wires 30*a* and 42*a* are electrically connected to the termination areas 58 and 60 respectively by solder or an electrically conductive cement. This also mechanically secures the resistance element 52 to the housing 12*a*. Thus, the two resistors provided by the resistance element 52 are each electrically connected in parallel with a separate one of the diodes 34*a*.

Referring to FIGURE 6, still another modification of the electrical component assembly of the present invention is generally designated as 10*b*. Electrical component 10*b* is substantially the same as the assembly 10*a* of FIGURE 5 except that the bottom surface 22*b* of the cavity 14*b* in the housing 12*b* is flat, and the resistance element 52 is within the cavity 14*b* with the base strip 54 seated on the bottom surface 22*b*, and the resistance film 56 facing away from the bottom surface 22*b*. The end terminal wires 30*b* extend through the end holes 62 in the resistance element 52 with the end terminal wire heads 32*b* being seated on the end termination areas 58. The diodes 34*b* are seated on the end terminal wire heads 32*b*, and leaf spring 36*b* extends between and contacts the top surfaces of the diodes 34*b*. The center terminal wire 42*b* extends through the leaf spring 36*b* and the center hole 64 in the resistance element 52. The center terminal wire head 44*b* holds the leaf spring 36*b* in contact with the center termination areas 60 of the resistance element 52. Thus, the two resistors provided by the resistance element 52 are each electrically connected in parallel with a separate one of the diodes 34*b*.

The present invention may be embodied in other specific forms without departing from the spirit or essential attributes thereof and, accordingly, reference should be made to the appended claims, rather than to the foregoing specification as indicating the scope of the invention.

We claim:

1. An electrical component assembly comprising a housing of an electrical insulating material having a cavity in one surface thereof, a pair of diodes mounted on the housing within said cavity in spaced apart relation, a pair of spaced apart terminal wires of conducting metal extending through the bottom surface of said cavity, means electrically connecting each of said pair of terminal wires to an electrode of a separate one of said diodes, a third terminal wire of a conducting metal extending through the bottom surface of said cavity, means electrically connecting said third terminal wire to the other electrode of both of said diodes, and a pair of electrical resistors mounted on said housing, means electrically connecting each of said resistors to said third terminal and a separate one of said pair of terminals so that each of said resistors is electrically connected in parallel with a separate one of said diodes.

2. An electrical component assembly in accordance with claim 1 in which the terminal wires are arranged in spaced, parallel relation with the third terminal wire being between the pair of terminal wires, and the terminal wires project beyond a second surface of the housing which is opposite to said one surface of the housing.

3. An electrical component assembly in accordance with claim 2 in which the electrical resistors are separate resistor elements mounted against the second surface of the housing, each of said resistor elements having one end contacting and secured to the center terminal wire and a second end contacting and secured to its respective terminal wire of said pair of terminal wires.

4. An electrical component assembly in accordance with claim 3 in which the housing has a groove extending across the second surface thereof, and the electrical resistors are seated on said groove.

5. An electrical component assembly in accordance with claim 2 in which the pair of resistors are provided by a resistance element comprising a flat base strip of an electrical insulating material, a film of a resistance material coated on a surface of said base strip, a separate termination area of an electrically conductive material coated on said resistance film at each end of said base strip, and a third termination area of an electrically conductive material coated on said resistance film between said end termination areas, the third terminal wire being electrically connected to said third termination area and each of the pair of terminal wires being electrically connected to a separate one of said end termination areas.

6. An electrical component assembly in accordance with claim 5 in which the resistance element has a separate hole extending through the base strip at each of said termination areas, and the terminal wires extend through said holes.

7. An electrical component assembly in accordance with claim 6 in which the resistance element is mounted against the second surface of the housing with the resistance film facing away from said second surface.

8. An electrical component assembly in accordance with claim 7 in which the housing has a groove extending across the second surface thereof, and the resistance element is seated within said groove.

9. An electrical component assembly in accordance with claim 6 in which the resistance element is within the cavity in the housing with the base strip of the resistance element seated on the bottom surface of the cavity and the resistance film facing away from the bottom surface of the cavity.

References Cited

UNITED STATES PATENTS 2,655,625 10/1953 Burton .............. 317—10

ROBERT K. SCHAEFER, *Primary Examiner.*

J. R. SCOTT, *Assistant Examiner.*